United States Patent
Montgomery et al.

(10) Patent No.: US 6,487,324 B2
(45) Date of Patent: *Nov. 26, 2002

(54) STEPPED ACOUSTIC IMPEDANCE-MATCHING TRANSFORMER FOR VERY NARROW CHANNEL ACOUSTIC TRAVELING WAVE LENS WAVEGUIDE

(75) Inventors: Robert M. Montgomery, Indialantic, FL (US); Reeder N. Ward, Palm Bay, FL (US); Mark T. Montgomery, Melbourne Beach, FL (US); Pat O. Bentley, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/896,167

(22) Filed: Jun. 29, 2001

(65) Prior Publication Data

US 2002/0031291 A1 Mar. 14, 2002

Related U.S. Application Data

(63) Continuation of application No. 09/235,695, filed on Jan. 22, 1999, now Pat. No. 6,320,989.

(51) Int. Cl.[7] ............................................... G02F 1/335
(52) U.S. Cl. ........................................... 385/7; 367/152
(58) Field of Search ............................. 385/7; 367/140, 367/150, 152

(56) References Cited

U.S. PATENT DOCUMENTS

| | | | |
|---|---|---|---|
| 2,430,013 A | 11/1947 | Hansell | 177/386 |
| 3,674,945 A | 7/1972 | Hands | 179/110 A |
| 3,676,592 A * | 7/1972 | Foster | 178/7.6 |
| 3,915,018 A * | 10/1975 | Karplus | 73/647 |
| 5,900,966 A * | 5/1999 | Kim et al. | 359/311 |
| 6,320,989 B1 * | 11/2001 | Montgomery et al. | 385/7 |

* cited by examiner

*Primary Examiner*—Rodney Bovernick
*Assistant Examiner*—Sarah U Song
(74) *Attorney, Agent, or Firm*—Allen, Dyer, Doppelt, Milbrath & Gilchrist, P.A.

(57) ABSTRACT

An acoustic impedance-matching transformer includes a tapered acoustic energy transmission (metal) block, having an acoustic impedance less than that of a piezo-electric transducer in a metric direction toward that of the acoustic propagation medium of the waveguide, and by an amount that allows tailoring of the relative spatial dimensions of mating surfaces of the transducer and the block, so as to provide efficient broadband coupling of acoustic energy. The surface area of the end face of the block engaging the transducer is a corresponding fraction of the area of the transducer. The tapered block focuses acoustic energy toward the input aperture of the waveguide channel. The taper is determined in accordance with difference between the acoustic impedance of the aluminum block and that of a second acoustic wave propagation element, such as a quarter-wave section of plexiglass, interposed between the waveguide channel and the tapered block.

7 Claims, 3 Drawing Sheets

STEPPED ACOUSTIC IMPEDANCE-MATCHING TRANSFORMER FOR VERY NARROW CHANNEL ACOUSTIC TRAVELING WAVE LENS WAVEGUIDE

This application is a continuation of Ser. No. 09/235,695 filed on Jan. 22, 1999 now U.S. Pat. No. 6,320,989.

FIELD OF THE INVENTION

The present invention relates in general to laser beam scanning systems, and is particularly directed to a acoustic impedance transformer, which is interposed between a relatively large sized, electrically driven piezo-electric transducer and an acousto-optic medium. The acoustic impedance transformer is configured to effectively match the impedance of the acoustic transducer with that of the acoustic wave propagation medium of the acousto-optic waveguide.

BACKGROUND OF THE INVENTION

FIG. 1 diagrammatically illustrates the configuration of a guided acoustic travelling wave lens device—one that employs a relatively narrowly dimensioned traveling wave channel—as comprising a laser 10, the optical beam output 11 of which is focussed by a cylindrical lens arrangement 12 and deflected by a mirror 13 onto an acousto-optic beam deflector 14, to which an RF input signal is applied. The acousto-optically modulated beam is then reimaged by a further spherical—cylindrical lens arrangement 15 onto a traveling lens cell 16, that contains a traveling wave lens transport medium 17 and a traveling wave lens launching transducer 18. The scanned beam is then imaged onto an image collection medium, such as a photographic film 19.

In a number of applications, the acousto-optic waveguide may be configured as a reduced height, guided acoustic travelling wave lens (ATWL) waveguide device, such as that diagrammatically illustrated at 30 in FIG. 2. In this type of acoustic wave guide architecture, a first end 32 of the waveguide has an acoustic wave input aperture 34 (to which an acoustic wave-launching piezo-electric transducer is coupled), at an input end of a relatively narrow (fluid-containing) channel 36, having a cross-section of width w and height h, where w>>h.

For a non-limiting illustration of examples of. documentation describing such guided acoustic traveling wave lens devices, attention may be directed to an article entitled: "Optical Beam Deflection Using Acoustic-Traveling-Wave Technology," by R. H. Johnson et al, presented at the SPIE Symposium On Optical, Electro-Optical, Laser and Photographic Technology, August 1976, FIG. 6 of which corresponds to FIG. 1, above, an article entitled: "Guided acoustic traveling wave lens for high-speed optical scanners," by S. K. Yao et al, Applied Optics, Vol. 18, pp 446–453, February 1979, and the U.S. Pat. No. 3,676,592 to Foster.

In a reduced height guided wave device, because the acoustic transmission properties of the acoustic propagation medium (fluid) within the waveguide channel 36 are considerably different from those of the transducer being used to launch the acoustic wave into the waveguide, there is a substantial acoustic impedance mismatch between the transducer and the waveguide. Indeed, the acoustic impedance of the waveguide may be on the order of twenty or more times that of the transducer.

In such a circumstance, in order to provide significant energy coupling from the transducer to the waveguide's acoustic propagation medium (e.g. water), the transducer must be allowed to resonate to very large internal power. This causes two problems. First, the acoustic transducer is prone to failure, as the result of the very substantial acoustic stresses required. Second, the bandwidth is limited.

SUMMARY OF THE INVENTION

In accordance with the present invention, this electrical and, acoustic impedance mismatch problem is successfully obviated by means of an acoustic impedance-matching transformer that is inserted between the acousto-optic medium and a piezo-electric transducer. The acoustic impedance-matching transformer is configured to effectively match the acoustic impedance of the acoustic transducer with that of the acousto-optic medium.

For this purpose, the acoustic impedance transformer is structured as a combination of steps and tapers, in the form of a cascaded series of acoustic propagation elements of successively decreasing acoustic impedance. At each interface between adjacent elements, the abutting surfaces or the elements are physically configured to provide an effectively acoustic impedance match between the elements, and thereby an efficient coupling of the acoustic energy from an element of relatively higher acoustic impedance material to an element of relatively lower acoustic impedance material. Over the length of the transformer, this sequential 'stepping' of the acoustic impedance and configurations of the abutting surfaces of successively adjacent elements operates to effectively match the acoustic impedance of the piezo-electric transducer to that of the liquid acoustic traveling wave lens.

The first acoustic wave propagation element of the transformer comprises a relatively dense, acoustic energy transmission material, such as a metal (e.g., aluminum) block. This first element has an acoustic impedance that differs (or is stepped down) from that of the piezo-electric transducer in a direction toward the relatively small acoustic impedance of the acoustic propagation medium (water) within the ATWL waveguide. In order to compensate for this difference in the acoustic impedances of the materials of the transducer and the aluminum block, the dimensions of the two materials in the direction of the step must be smaller than the acoustic wavelength in the respective material. To this end, the spatial dimensions of the surface of the block are larger than those of the abutting wave-launching surface of the transducer, and by an amount proportional to the inverse ratio of their respective acoustic impedances, whereby the resulting acoustic-coupling interface provides broadband efficient coupling of acoustic energy therebetween.

Although such dimensioning of the engaging faces of the piezo electric transducer and the aluminum block ensures efficient coupling of acoustic energy from the transducer into the aluminum block, the cross-section of the aluminum block at its acoustic energy receiving face adjoining the piezo-electric transducer is still larger than that of the acoustic wave coupling aperture of the waveguide channel. Also, the acoustic impedance of the aluminum block is considerably larger than that of the waveguide channel.

These differences are compensated by tapering the aluminum block toward the aperture of the waveguide channel, so as to focus the acoustic energy to a high acoustic energy density value at a reduced cross-section end face adjacent to the acoustic input aperture to the waveguide, and by providing a second transformer element between the reduced cross-section end face of the tapered aluminum block and the acoustic input aperture to the waveguide. The extent to which the first transformer block is tapered is determined in accordance with the difference between the acoustic impedance of the aluminum block and that of the second acoustic wave propagation element, such as a section of plexiglass or the like, so as to provide a compensating abutting surface area mismatch therebetween, as in the case of the piezo-electric transducer and the input end of the tapered aluminum block.

The plexiglass section has a cross-section corresponding to that of the acoustic input aperture of the waveguide. Since plexiglass has an acoustic impedance that is approximately twice that of water, it is configured as a quarter-wave plate section, so as to provide an acoustic impedance match between its interface with the reduced cross-section end of the tapered aluminum block and the waveguide.

The combined effect of the increased acoustic power density at the exit end of the aluminum block, the increased cross-sectional area of the plexiglass quarter-wave plate, and the ratios among the acoustic impedance parameters of the mutually adjoining aluminum block, quarter-wave plate and waveguide channel thereby provides an efficient, broadband coupling into the waveguide channel of acoustic energy originally launched from the piezo-electric transducer.

DETAILED DESCRIPTION

As noted earlier, in applications that employ a fluid medium (rectangular) waveguide of very reduced height cross-section (i.e., having a fixed width w and height h (where h<<w)), the substantial mismatch between the acoustic transmission properties of the acoustic wave propagation medium (water) and those of the (piezo-electric) transducer typically creates a significant disparity between the acoustic and electrical impedance parameters of the piezo-electric transducer and those of downstream and upstream components to which it is coupled.

Figure 1:
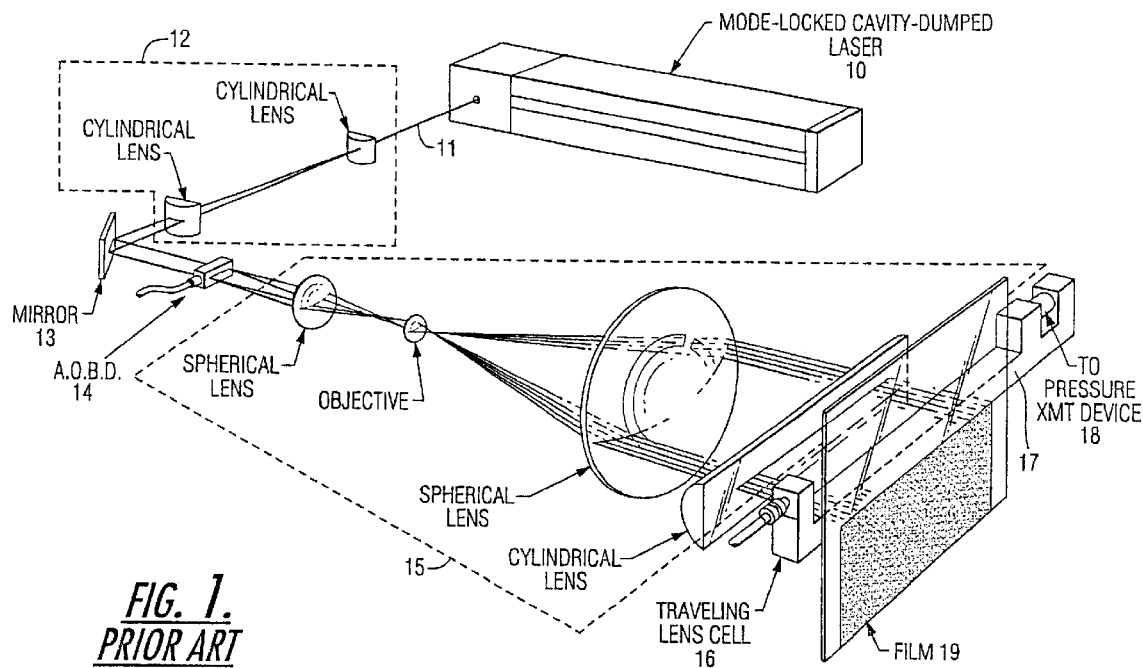
FIG. 1 diagrammatically illustrates the configuration of a guided acoustic travelling wave lens device.
Figure 2:
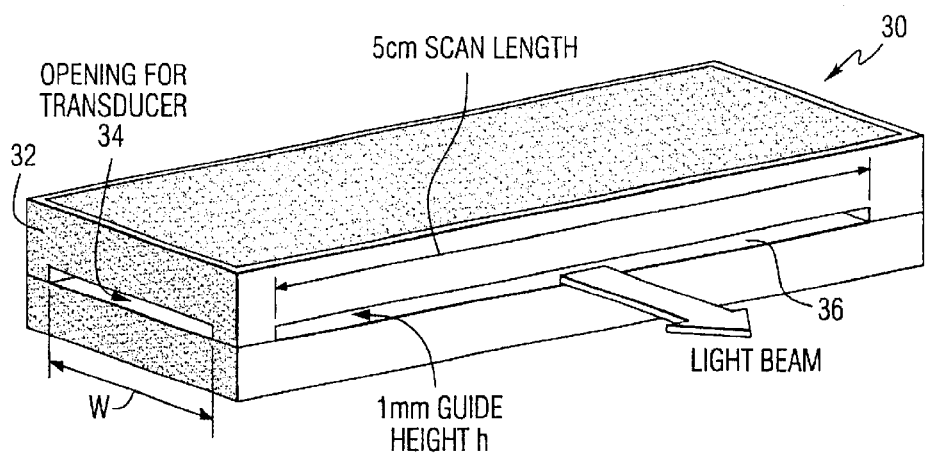
FIG. 2 diagrammatically illustrates a conventional acoustic traveling wave lens waveguide of a fixed narrow rectangular channel cross-section of fixed width and height.
Figure 3:
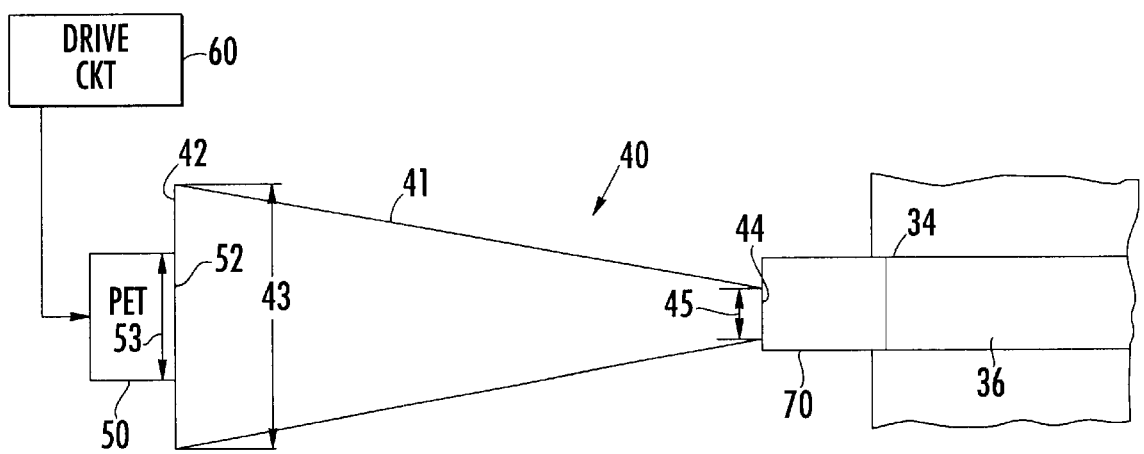
FIG. 3 diagrammatically illustrates an acoustic impedance-matching transformer in accordance with the present invention.
Figure 4:
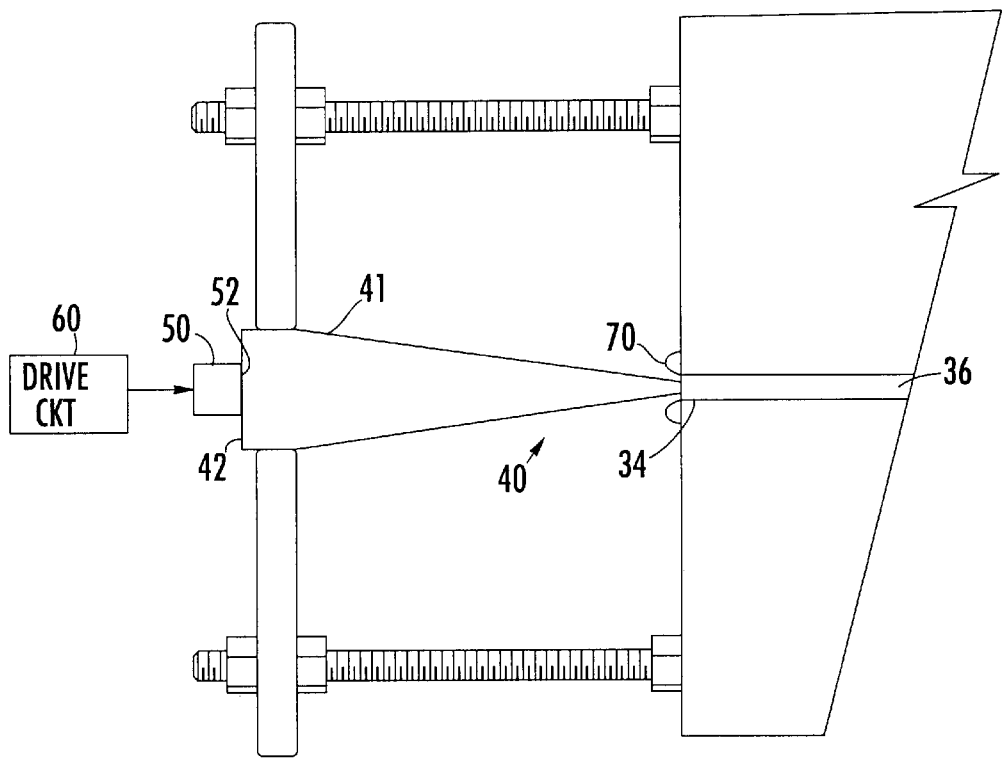
FIG. 4 diagrammatically illustrates a mounting arrangement for the acoustic impedance-matching transformer of FIG. 3.

This impedance mismatch problem is successfully obviated by means of the acoustic impedance transformer structure diagrammatically illustrated in FIGS. 3 and 4, in which an acoustic impedance-matching transformer 40 is inserted between the relatively narrow acoustic wave coupling aperture 34 of the waveguide channel 36 and a piezoelectric transducer 50, to which a drive signal is applied from upstream RF drive signal interface circuitry 60.

To compensate for this mismatch, the acoustic impedance transformer 40 includes a first acoustic wave propagation element 41, in the form of relatively dense, acoustic energy transmission material, such as metal (e.g., aluminum as a non-limiting example). The aluminum block 41 has an acoustic impedance that differs from that of the piezo-electric transducer 50 in a direction toward that of the acoustic propagation medium (water) of the waveguide. Namely, the acoustic impedance of the first transformer element is 'stepped-down' from that of the piezo-electric transducer. Because of the difference, the relative spatial dimensions of the mating surfaces of the transducer 50 and the aluminum block 41 are tailored by an amount that provides broadband efficient coupling of acoustic energy (i.e., provide an effectively impedance-matched acoustic interface) therebetween.

For the illustrated example, the ratio of the respective acoustic impedances of the piezo-electric transducer 50 and the aluminum block 40 is 32.3/17.3; this means that to provide an efficient coupling of acoustic energy between these two components, the surface area of the end face 42 of the aluminum block 41 engaging the acoustic energy launching face 52 of transducer 50 should be a corresponding multiple of (32.2/17.3 times) the area of the acoustic energy-launching face 52 of transducer 50. As a non-limiting example, therefore, assuming the same dimension (e.g., 5 mm) in the width direction of the various components, and with a piezo-electric transducer height on the order of 1.6 mm, the height 43 of the end face 42 of the aluminum block 40 needs to be (32.3/17.3) times the height 53 of end face 52 of piezo-electric transducer 50, or approximately 3 mm. For a 500 KHz system, the acoustic wavelength in aluminum is 12 mm, so that the height of the aluminum is considerably less than the wavelength.

Although such dimensioning of the engaging faces of the piezo-electric transducer 50 and the aluminum block 41 serves to provide efficient coupling of acoustic energy from the transducer into the aluminum block, the cross-sectional area (3 mm×5 mm) of the aluminum block at its acoustic energy receiving face 42 is considerably larger than that (1 mm×5 mm) of the acoustic wave coupling aperture 34 of the waveguide channel 36. In addition, event though the acoustic impedance of the aluminum block 41 is less than the that of the piezo-electric transducer, it is still considerably larger than that of the propagation medium (e.g., water) of the waveguide channel 36.

To compensate for this front end mismatch, the aluminum block 41 is physically tapering toward the acoustic input aperture 34 of the waveguide channel. This has the effect of concentrating or focusing the acoustic energy traveling through the aluminum block, so as to achieve a prescribed acoustic energy power density at a reduced cross-section end face 44 of the aluminum block adjacent to the acoustic aperture of the waveguide. The extent to which the acoustic energy is concentrated at the is end face 44 of the aluminum block 41 is determined in accordance with difference between the acoustic impedance of the aluminum block and a further 'stepped-down' impedance of a second acoustic wave propagation element 70, such as a section of plexiglass or the like, as a non-limiting example. This further impedance-transforming element is physically sized to match the size of the acoustic input aperture 34 of the waveguide.

Plexiglas has an acoustic impedance (e.g., $3.16 \times 10^6$ that is less than that of the tapered aluminum block, but greater than (approximately twice that of water ($1.5 \times 10^6$) the waveguide channel 36. Based upon these parameters, the second (plexiglass) element 70 may be configured as a quarter-wave plate. Since the plexiglass element 70 has the same dimensions as the aperture 34 (i.e. a height of 1 mm), then to provide a substantial impedance match between the aluminum block and the plexiglass section, the ratio of the area of the abutting end face 44 of the aluminum block 41 is set at a fraction of the area of the plexiglass element 70. This fraction is based upon the ratios of the inherent acoustic impedances of the two elements and desired acoustic coupling of the increased power density provided at the end face 44 of the aluminum block 71. In the present example, the height 45 of the second end face 44 of the aluminum block 41 may have a height on the order of 0.38 mm.

Since the plexiglass element 70 has a cross-section corresponding to that of the acoustic input aperture 34 of the ATWL waveguide 30 and an acoustic impedance that is approximately twice that of the waveguide medium (water), it is preferably configured as a quarter-wave plate section, so as to provide an acoustic impedance match between its interface with the reduced cross-section end of the tapered aluminum block and the waveguide. The result of this cascaded series of acoustic propagation elements of successively decreasing or 'stepped-down' acoustic impedance transform components—from the input face of tapered aluminum block to the exit face of the plexiglass quarter-wave plate—is to effectively match the acoustic impedance of the piezo-electric transducer to that of the liquid acoustic traveling wave lens.

Figure 5:
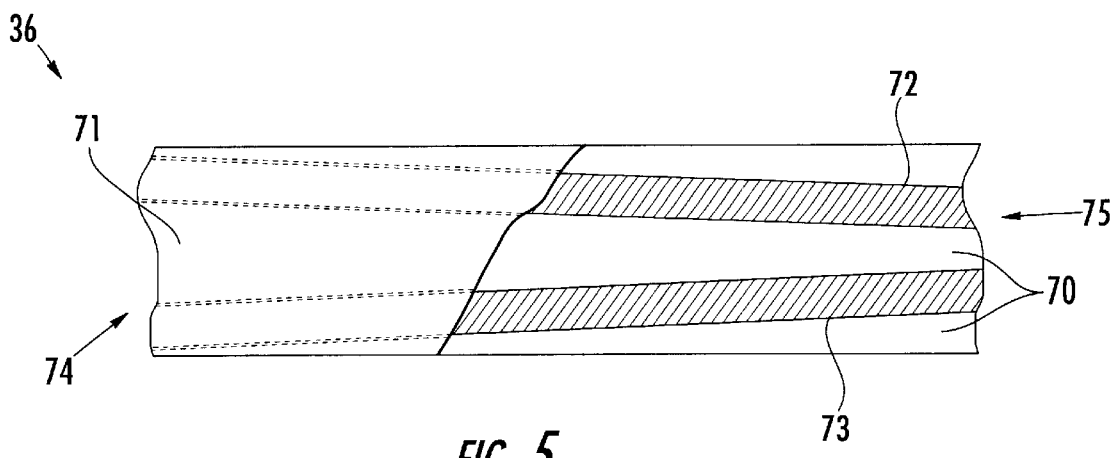
FIG. 5 is a partial cross-sectional view of the narrow channel waveguide according to the present invention.

Turning now to the partial cross-sectional view of FIG. 5, one embodiment of the waveguide channel 36 will now be described. The scanned optical beam passes through the waveguide channel 36, which may be defined by first and second generally parallel spaced apart walls 70, 71. The waveguide channel 36 may further be defined by third and fourth generally spaced apart walls 72, 73 which intersect the first and second spaced apart walls 70, 71. The first, second, third, and fourth walls 70, 71, 72, 73 confine the acoustic wave propagation medium therebetween. The separation between the third and fourth spaced-apart walls 72, 73 may be less than about one-half wavelength, but greater than about one-quarter wavelength of the acoustic traveling wave, for example. Additionally, the separation between the third and fourth spaced apart walls 72, 73 may decrease from a first end 74 of the channel waveguide 36 to a second end 75 thereof to maintain a constant acoustic power density of the acoustic wave traveling therealong.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. An acousto-optic scanner comprising:

an acoustic transducer for generating an acoustic wave;

a narrow channel waveguide;

an acoustic wave propagation medium in said narrow channel waveguide;

an optical beam generator for generating an optical beam through said acoustic wave propagation medium to be modulated by said acoustic wave; and an acoustic impedance transformer connected between said acoustic transducer and said narrow channel waveguide and being physically configured to effectively match an impedance of said acoustic transducer with an impedance of said acoustic wave propagation medium.

2. The acousto-optic scanner according to claim 1, wherein said acoustic transducer has an electrical impedance matched to that of drive circuitry supplying an electrical drive signal thereto.

3. The acousto-optic scanner according to claim 1, wherein said narrow channel waveguide includes first and second generally parallel spaced apart walls and third and fourth generally spaced apart walls intersecting said first and second spaced apart walls and confining the acoustic wave propagation medium therebetween.

4. The acousto-optic scanner according to claim 3, wherein said separation between said third and fourth spaced-apart walls is less than one-half a wavelength, but greater than one-quarter wavelength of said acoustic wave.

5. The acousto-optic scanner of claim 1 wherein said acoustic wave propagation medium comprises a liquid.

6. A method for acousto-optic scanning using an acousto-optic scanner comprising an acoustic transducer, a narrow channel waveguide, an acoustic wave propagation medium in the narrow channel waveguide, and an optical beam generator for generating an optical beam through the acoustic wave propagation medium, the method comprising:

effectively matching an impedance of the acoustic transducer with an impedance of the acoustic wave propagation medium by connecting an acoustic impedance transformer therebetween, the acoustic impedance transformer being physically configured to effectively match the impedances; and launching an acoustic wave from the acoustic transducer through the acoustic impedance transformer and into the narrow channel waveguide while the optical beam passes therethrough to thereby perform acousto-optic scanning.

7. A method according to claim 6, wherein said acoustic transducer has an electrical impedance matched to that of drive circuitry supplying an electrical signal that stimulates said acoustic transducer to launch an acoustic wave into said acoustic impedance transformer.

* * * * *